US008687649B2

(12) United States Patent
Armstrong et al.

(10) Patent No.: US 8,687,649 B2
(45) Date of Patent: Apr. 1, 2014

(54) MESSAGE FORWARDING TOWARD A SOURCE END NODE IN A CONVERGED NETWORK ENVIRONMENT

(75) Inventors: William J. Armstrong, Rochester, MN (US); Claude Basso, Raleigh, NC (US); Chih-Jen Chang, Apex, NC (US); Josep Cors, Rochester, MN (US); Daniel G. Eisenhauer, Austin, TX (US); Henry J. May, Mantorville, MN (US); Christoph Raisch, Gerlingen (DE); Renato J. Recio, Austin, TX (US); Colin B. Verrilli, Apex, NC (US); Chetan S. Yaliwal, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 13/042,776

(22) Filed: Mar. 8, 2011

(65) Prior Publication Data
US 2012/0230334 A1 Sep. 13, 2012

(51) Int. Cl.
*H04J 3/22* (2006.01)

(52) U.S. Cl.
USPC .......................... 370/466; 370/360; 370/392

(58) Field of Classification Search
None
See application file for complete search history.

(56) References Cited

U.S. PATENT DOCUMENTS

| 5,459,723 | A | 10/1995 | Thor |
| 5,917,823 | A | 6/1999 | Benning et al. |
| 5,920,699 | A * | 7/1999 | Bare .............................. 709/225 |
| 7,573,876 | B2 | 8/2009 | Lebizay et al. |
| 7,733,770 | B2 | 6/2010 | McAlpine et al. |
| 2008/0068990 | A1* | 3/2008 | Wu ................................ 370/229 |
| 2008/0075089 | A1* | 3/2008 | Evans et al. ............... 370/395.52 |
| 2009/0274153 | A1* | 11/2009 | Kuo et al. ...................... 370/392 |
| 2012/0063316 | A1* | 3/2012 | Ghanwani et al. ............ 370/235 |
| 2013/0007839 | A1* | 1/2013 | Mao et al. ........................ 726/1 |

FOREIGN PATENT DOCUMENTS

| CN | 101631076 A | 1/2010 |
| CN | 101815040 A | 8/2010 |
| WO | 2009136933 A1 | 11/2009 |
| WO | 2010046294 A1 | 4/2010 |

OTHER PUBLICATIONS

PCT/IB2012/050922—International Filing Date: Feb. 28, 2012, International Search Report and Written Opinion dated Jul. 12, 2012.
American National Standard of Accredited Standards Committee INCITS (working draft)—Fibre Channel, Rev 2.00; 180 pp—Jun. 4, 2009; Global Engineering, Englewood CO.

* cited by examiner

*Primary Examiner* — Ayaz Sheikh
*Assistant Examiner* — Mounir Moutaouakil
(74) *Attorney, Agent, or Firm* — Yudell Isidore Ng Russell PLLC

(57) ABSTRACT

A network node that forwards traffic of a converged network received from a source end node receives a second message addressed to the network node, but intended for the source end node. The second message includes at least a portion of a first message originated by the source end node and previously forwarded by the network node. The network node extracts from the first message a source identifier of the source end node in a first communication protocol and determines by reference to a data structure a destination address of the second message in a second communication protocol. The network node modifies the second message to include the destination address and forwards the second message toward the source end node in accordance with the destination address.

18 Claims, 4 Drawing Sheets

US 8,687,649 B2

MESSAGE FORWARDING TOWARD A SOURCE END NODE IN A CONVERGED NETWORK ENVIRONMENT

BACKGROUND OF THE INVENTION

1. Technical Field

The present invention relates in general to network communication, and in particular, to message forwarding toward a source end node in a converged network environment.

2. Description of the Related Art

A current design trend in high performance computing systems is to reduce power consumption, physical space requirements, management and maintenance by reducing the number of physical connections that must be supported by the computing system. One technique for reducing the number of physical connections required by a computing system is to converge multiple different types of data traffic on a common physical connection. For example, conventional high performance computing systems have communicated with bulk storage (e.g., storage area networks (SAN)) utilizing a first physical connection employing a first communication protocol, such as Fibre Channel, and have additionally communicated with a local or wide area network utilizing a distinct second physical connection employing a second communication protocol, such as Ethernet. In this case, a reduction in the number of physical connections can be achieved by converging storage and network traffic on a single physical connection employing Fibre Channel over Ethernet (FCoE), which encapsulates Fibre Channel frames within Ethernet frames. FCoE is defined, for example, by the FC-BB-5 standard promulgated by the T11 Committee of the International Committee for Information Technology Standards (INCITS), which standard is incorporated herein by reference.

Convergence of multiple types of traffic on a physical connection has the advantage of reducing the number of required physical connections while leveraging the prior development of standards and maintaining compatibility with installed infrastructure. However, network convergence can also lead to difficulty in retaining or implementing desired features of the converged data traffic. The present disclosure addresses one such difficulty by enabling communication of messages, such as congestion notification messages, back to a source end node in a communication network in which the source end node is obscured by the convergence of the data traffic.

SUMMARY OF THE INVENTION

In accordance with at least one embodiment, a network node that forwards traffic of a converged network received from a source end node receives a second message addressed to the network node, but intended for the source end node. The second message includes at least a portion of a first message originated by the source end node and previously forwarded by the network node. The network node extracts from the first message a source identifier of the source end node in a first communication protocol and determines by reference to a data structure (e.g., a table) a destination address of the second message in a second communication protocol. The network node modifies the second message to include the destination address and forwards the second message toward the source end node in accordance with the destination address. In one implementation, the first communication protocol is Fibre Channel, the second communication protocol is Ethernet, the first message is a Fibre Channel over Ethernet (FCoE) frame, and the second message is a congestion notification message (CNM).

DETAILED DESCRIPTION OF ILLUSTRATIVE EMBODIMENT

Disclosed herein are techniques for communicating messages to a source end node of data traffic in a communication network in which the source end node is obscured by the convergence of the data traffic.

One environment in which the disclosed techniques can be applied is a converged communication network that employs Fibre Channel over Ethernet (FCoE). The FC-BB-5 standard referenced above has defined a FCoE Forwarder (FCF), and the FC-BB-6 draft standard currently under development by the T11 Committee of INCITS has defined a FCoE Data Forwarder (FDF) function, which enables Ethernet switches to enforce Fibre Channel hard zoning and serve the data forwarding role of any FCF. To perform data forwarding, FCFs and FDFs translate source and destination media access control (MAC) addresses specified in Ethernet frames. This MAC address translation prevents implementation of congestion notification mechanisms defined, for example, by IEEE Standard 802.1Qau (incorporated herein by reference), by obscuring the true source end node of data traffic. As described further below, the disclosed techniques enable messages, such as congestion notification messages, to be directed to the source end node of a data traffic flow in the presence of converged data traffic.

Figure 1:
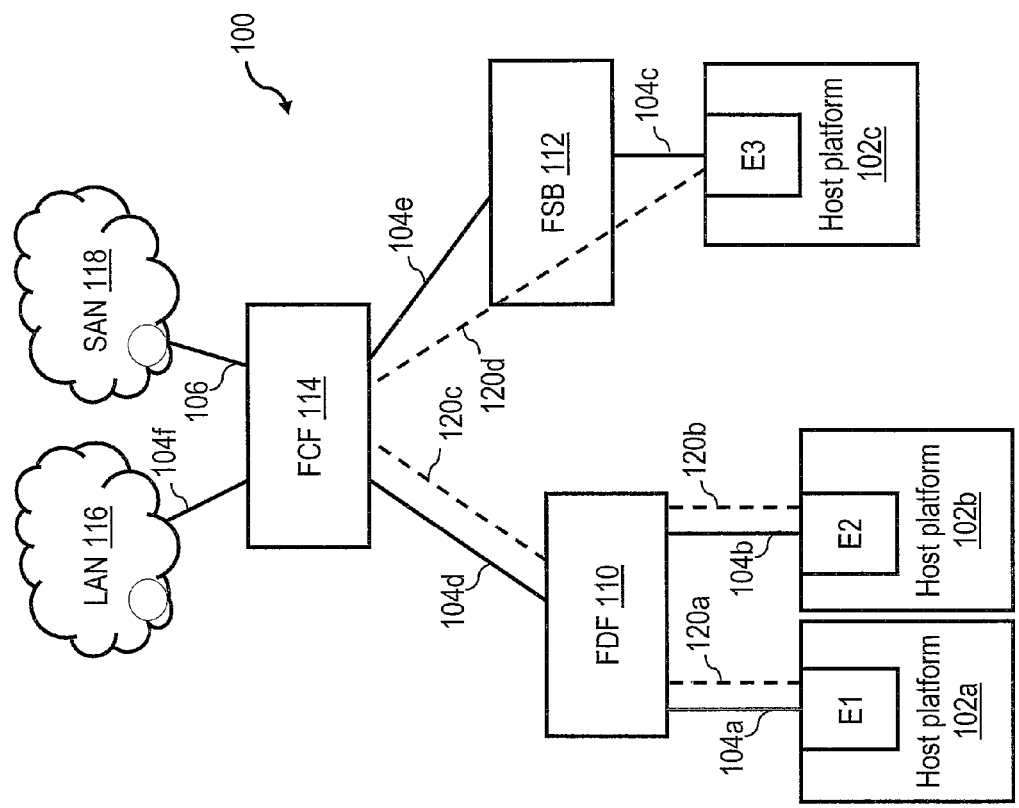
FIG. 1 is a high level block diagram of a converged network environment in accordance with one embodiment.

With reference now to the figures and, in particular, with reference to FIG. 1, there is illustrated a high level block diagram of exemplary converged network environment 100 in accordance with one embodiment. Exemplary converged network environment 100 includes multiple end nodes represented by end nodes E1-E3, which can serve as sources or sinks of network traffic. For example, in some implementations, end nodes E1-E3 may be respective converged network adapters (CNAs) of host platforms 102a-102c, such as client, server or peer computer systems.

End nodes E1 and E2 are each connected by a respective one of physical Ethernet links 104a, 104b to an FDF 110, which as noted above is an Ethernet switch that provides Fibre Channel (FC) support, such as forwarding FC fabric functions (e.g., name server requests and registered state change notifications (RSCNs)), locally enforcing zoning by mapping FC zoning to Ethernet access control lists (ACLs), managing FCoE Initialization Protocol (FIP) keep-alive messaging, and MAC address mapping for FCoE frames.

FDF 110 is in turn connected by physical Ethernet link 104d to FCF 114. As defined by the FC-BB-5 standard, FCF 114 is a FC switching element that is able to forward FCoE frames across one or more FCF-MACs, and that optionally includes one or more lossless Ethernet bridging elements and/or a FC fabric interface. In the present example, FCF 114 does include an Ethernet bridging element 206 (see, e.g., FIG. 2) supporting connection via physical Ethernet link 104f to local area network (LAN) 116 and a FC fabric interface 208 (see, e.g., FIG. 2) supporting connection via a physical Fibre Channel link 106 to a storage area network (SAN) 118.

Exemplary converged network environment 100 additionally includes a FIP snooping bridge (FSB) 112, which is connected to FCF 114 and to end node E3 of host platform 102c by respective physical Ethernet links 104e and 104c. FSB 112 is an Ethernet bridge that supports Priority Flow Control (PFC) as defined in IEEE standard 802.1Qbb, Enhanced Transmission Selection (ETS) as defined in IEEE standard 802.1Qaz, Data Center Bridging Capabilities Exchange Protocol (DCBX) as defined in IEEE standard 802.1Qaz, and the dynamic ACL functionality described in FC-BB-5 Annex C. FCoE traffic is transparent to FSB 112, meaning that FSB 112 does not decapsulate or examine the contents of Ethernet frames encapsulating FC frames.

As is known in the art, Fibre Channel relies on physical point-to-point FC links between FC nodes. When this arrangement is virtualized in an FCoE network environment, such as that illustrated in FIG. 1, the physical point-to-point FC links are replaced by virtual links over physical Ethernet links, such as physical Ethernet links 104a-104e. For example, in exemplary converged network environment 100, a virtual link 120a is established over physical Ethernet link 104a, virtual link 120b is established over physical Ethernet link 104b, virtual link 120c is established over physical Ethernet link 104d, and virtual link 120d is established over physical Ethernet links 104b and 104c. It should be observed that virtual link 120d spans multiple physical Ethernet links 104 because FCoE traffic is transparent to FSB 112.

In converged network environments such as exemplary converged network environment 100, some virtual or physical links can become congested, for example, because multiple source end nodes may direct traffic to the same destination end node or physical link. For example, in FIG. 1, physical Ethernet link 104c can become congested by end nodes E1 and E2 transmitting traffic destined for end node E3 at a rate greater than the transmission rate of physical Ethernet link 104c. As described in greater detail below, if FSB 112 detects the congestion on physical Ethernet link 104c, FSB 112 is unable to notify a source end node (e.g., end node E1 and/or E2) of the congestion due to its lack of knowledge of the actual source of the frames causing the congestion. To support the transmission of messages such as congestion notification messages to the source end node of traffic on a converged network, such as that depicted in FIG. 1, a node having knowledge of the converged protocols (e.g., FCF 114) is enhanced to forward messages toward the source end node that originated the traffic.

Figure 2:
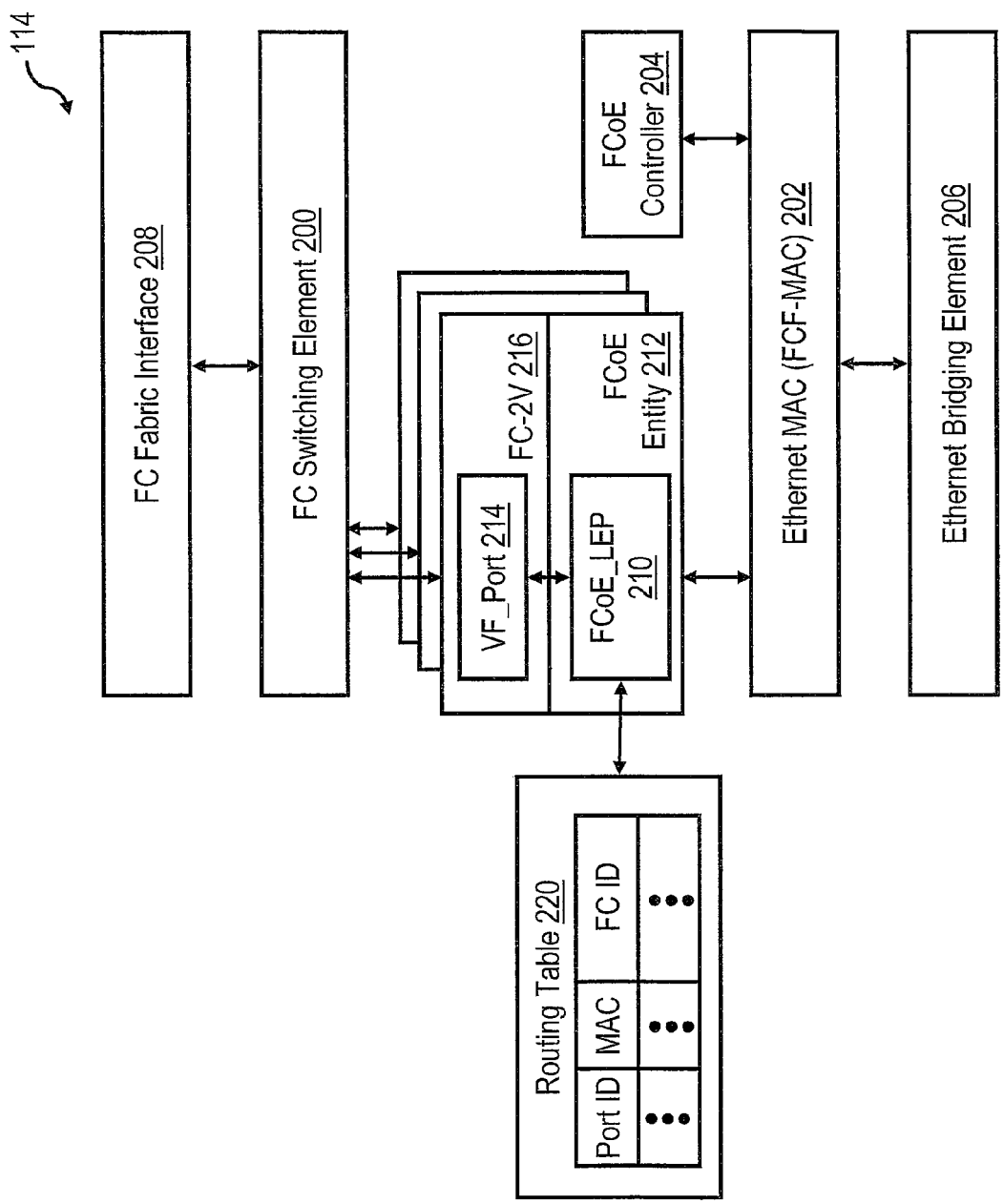
FIG. 2 is a high level block diagram of an exemplary Fibre Channel over Ethernet (FCoE) forwarder (FCF) in accordance with one embodiment.

Referring now to FIG. 2, there is depicted a more detailed functional model of an exemplary FCF 114 in accordance with one embodiment. In various implementations, FCF 114 can be implemented in special-purpose and/or general-purpose processing hardware. In some cases, the disclosed functionality may be implemented entirely in hardware (e.g., integrated circuitry). In other cases, the special-purpose or general-purpose processing hardware may process firmware and/or software stored in a data storage device/medium to implement the described functionality.

As depicted, FCF 114 includes a FC switching element 200, which is the functional entity that performs Fibre Channel switching among virtual and physical FC switch ports and end node ports (e.g., E_Ports, F_Ports, VE_Ports, and VF_Ports). FC switching element 200 has at least one (and in some cases many) associated Ethernet MAC(s) (FCF-MAC) 202. FCF-MAC 202 is coupled with an FCoE controller 204 and is further coupled with a lossless Ethernet bridging element 206. FC switching element 200 is additionally coupled with a FC fabric interface 208, which provides native E_Port and F_Port connectivity to a FC switch or FC node, respectively. FCF 114 forwards FCoE frames addressed to one of its FCF-MACs 202 based on the destination ID (D_ID) of the encapsulated FC frames.

FCoE controller 204 supports the instantiation of one or more virtual port/FCoE link end point (LEP) pairs. In the present example, FCF-MAC 202 is a virtual F_port capable FCF-MAC 202, and FCoE controller 204 accordingly instantiates, on an as-needed basis, an FCoE LEP 210 within an FCoE entity 212 at the FC-2M level and a VF_Port 214 at the FC-2V level 216 (additional mandatory functions of FCoE controller 204 are defined in the FC-BB-5 standard).

FCoE_LEP 210 performs the encapsulation of FC frames into FCoE frames in transmission and the decapsulation of FCoE frames into FC frames in reception. FCoE_LEP 210 operates according to the MAC address of the local link end-point and the MAC address of the remote link end-point. Thus, when encapsulating FC frames into FCoE frames, FCoE_LEP 210 utilizes the MAC address of the local link end-point (i.e., the FCF-MAC address) as the source address and the MAC address of the remote link end-point as the destination address of the generated FCoE frame. When decapsulating FC frames from FCoE frames, FCoE_LEP 210 verifies that the destination address of the received FCoE frame is equal to the MAC address of the local link end-point (i.e., the FCF-MAC address) and verifies that the source address of the received FCoE frame is equal to the MAC address of the remote link end-point. If either check fails, FCoE_LEP 210 discards the FCoE frame.

Each FCoE_LEP 210 is coupled to a routing data structure (e.g., table, list, tree, etc.), such as routing table 220. As shown, routing table 220 includes a plurality of table entries each associating identifiers of the ports of FCF 114 (i.e., port IDs) with MAC addresses and FC IDs.

VF_Port 214 is an instance of the FC-2V sublevel of Fibre Channel that operates as a virtual F_Port. VF_Port 214 receives FC frames from FC switching element 200 and sends them to the proper FCoE_LEP 210 for encapsulation and transmission over the lossless Ethernet network. In addition, VF_Port 214 sends FC frames received from one of its FCoE_LEPs 210 to FC switching element 200. When receiving FC frames from one of its FCoE_LEPs 210, VF_Port 214 verifies that the source ID (S_ID) of the received FC frame is equal to the address identifier of the VN_Port associated to that FCoE_LEP 210, and if not, discards the FC frame.

Figure 3:
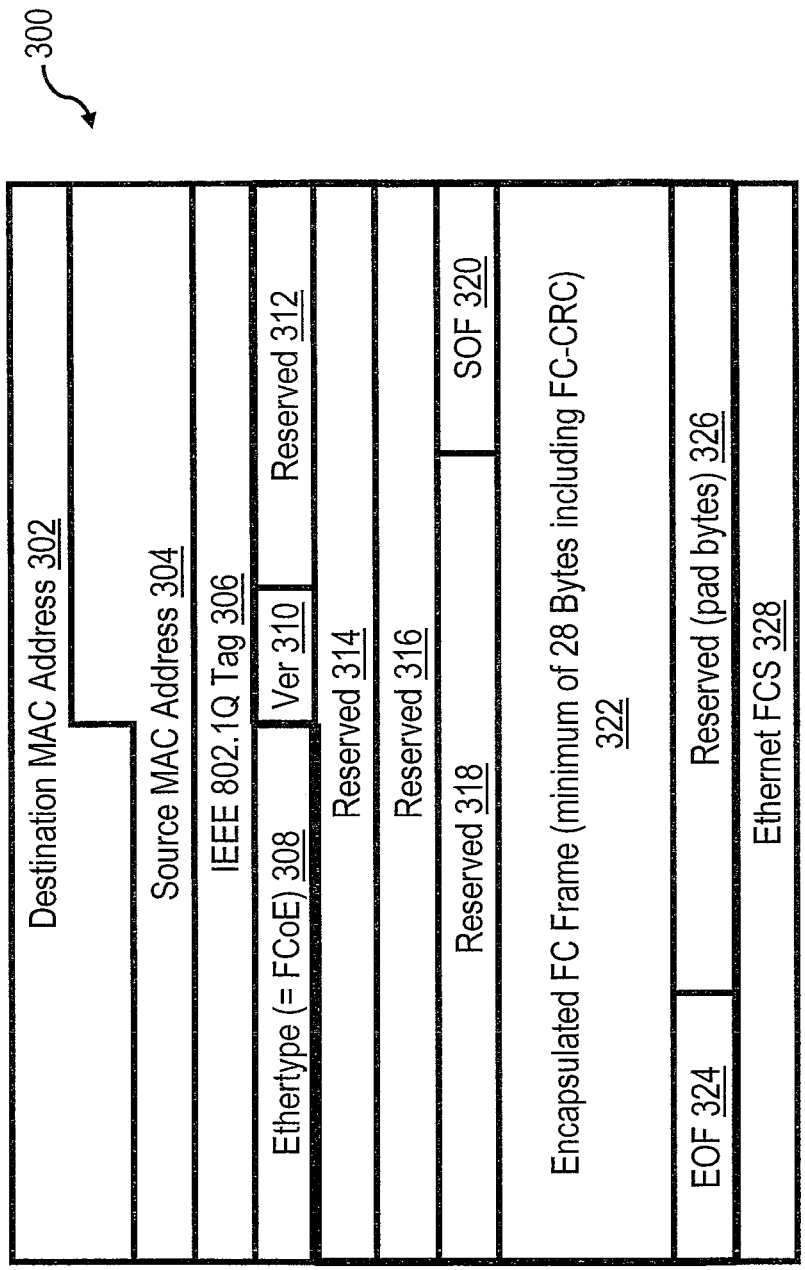
FIG. 3 depicts a conventional FCoE frame.

With reference now to FIG. 3, the format of a conventional FCoE frame 300 is illustrated. As shown, FCoE frame 300 begins with a destination MAC address field 302 and source MAC address field 304 utilized to specify the OSI Layer 2 (i.e., Ethernet) destination and source addresses of FCoE frame 300. Next, FCoE frame 300 includes an optional IEEE 802.1Q tag field 306 that can be utilized to specify a virtual LAN (VLAN) to which an Ethernet frame belongs and a version field 310 identifying which version of Ethernet is being employed. Thereafter, FCoE frame 300 includes a number of reserved fields 312-318, which can be utilized to implement vendor-specific functionality. Following reserved fields 312-318, FCoE frame 300 includes the encapsulated FC frame 322 delimited by start of frame (SOF) and end of frame (EOF) fields 320 and 324, respectively. Encapsulated FC frame 322 is followed, if necessary, by a reserved field 326 utilized to pad FCoE frame 300 to a desired byte boundary.

Finally, FCoE frame 300 includes an Ethernet frame check sequence (FCS) field 328 containing a checksum for error detection and correction.

As noted above, when a conventional FCoE frame 300 traverses virtual links, such as virtual links 120a-120d of FIG. 1, destination and source MAC addresses specified by fields 302-304 are updated by each network node terminating a virtual link, while the encapsulated FC frame 322 remains unchanged. For example, consider an exemplary scenario in which the components of exemplary converged network environment 100 are assigned the FC IDs and Ethernet MAC addresses set forth in Table I, below. It should be noted that because FDF 110, FCF 114 and FSB 112 do not source or sink FCoE data plane traffic (and instead only source and sink FCoE control plane traffic), FDF 110, FCF 114 and FSB 112 are not assigned FC IDs.

TABLE I

|     | FCID | MAC    |
|-----|------|--------|
| E1  | 1    | FE1    |
| E2  | 2    | FE2    |
| E3  | 3    | FE3    |
| FDF | NA   | FDFMAC |
| FCF | NA   | FCFMAC |
| FSB | NA   | FSBMAC |

Assuming the transmission of an FCoE frame 300 from end node E1 to end node E3, the FCoE frame 300 will exit end node E1 specifying the source and destination MAC addresses (SMAC and DMAC) and FC source and destination IDs (FC SID and FC DID) set forth in Table II.

TABLE II

| SMAC | DMAC   | FC SID | FC DID |
|------|--------|--------|--------|
| FE1  | FDFMAC | 1      | 3      |

Upon exit from FDF 110, FCoE frame 300 will specify the source and destination MAC addresses set forth in Table III, below.

TABLE III

| SMAC   | DMAC   | FC SID | FC DID |
|--------|--------|--------|--------|
| FDFMAC | FCFMAC | 1      | 3      |

The source and destination MAC addresses of FCoE frame 300 are further updated by FCF 114 as indicated in Table IV, below.

TABLE IV

| SMAC   | DMAC | FC SID | FC DID |
|--------|------|--------|--------|
| FCFMAC | FE3  | 1      | 3      |

The updating of source MAC address field 304 in this manner complicates communication by downstream nodes of messages, such as congestion notification messages, back toward end node E1 because the source MAC address of end node E1 is obscured.

Figure 4:
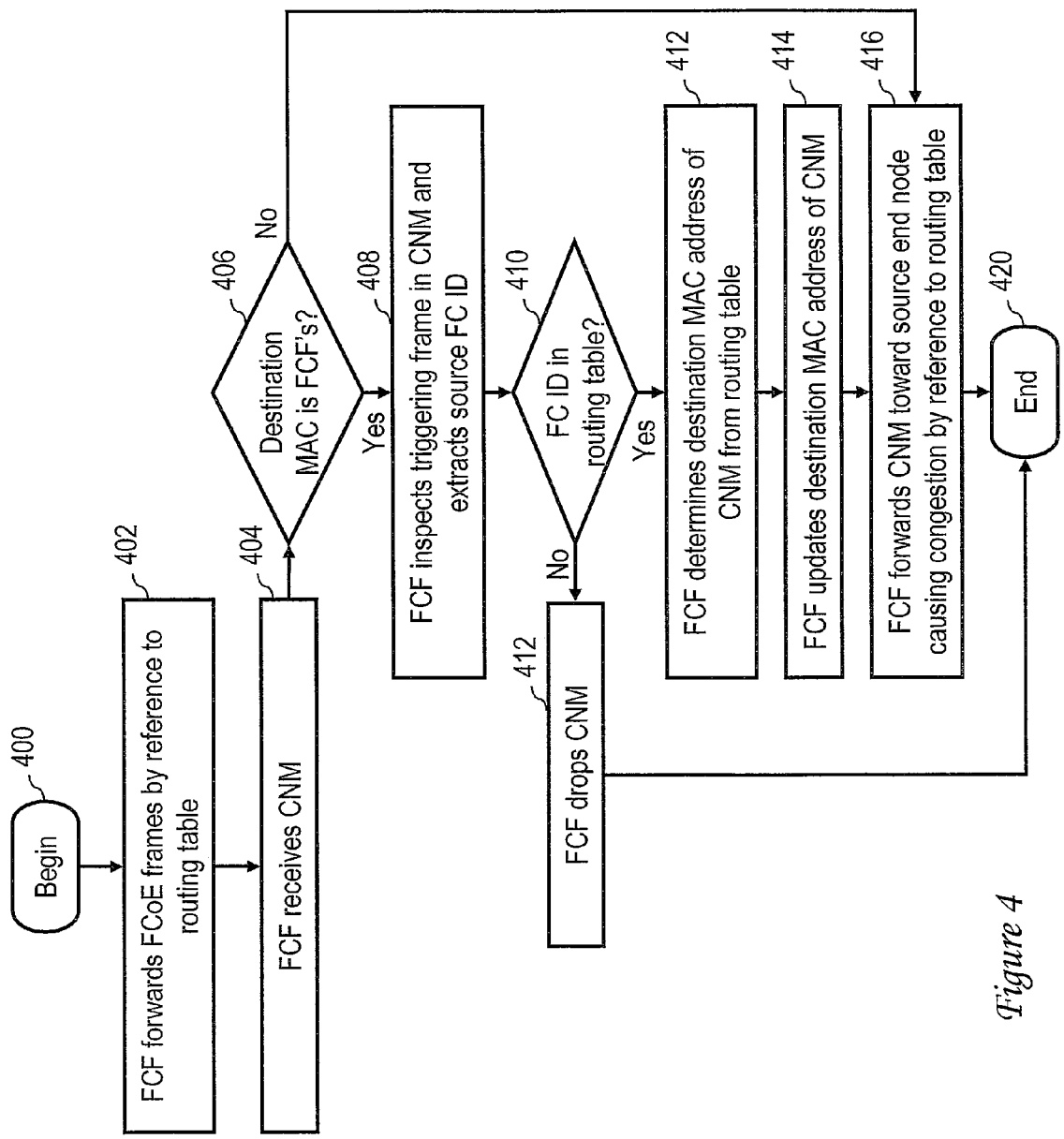
FIG. 4 is a high level logical flowchart of an exemplary process by which a network message is forwarded toward a source end node in a converged network environment in accordance with one embodiment.

Referring now to FIG. 4, there is depicted a high level logical flowchart of an exemplary process by which a network message is forwarded toward a source end node in a converged communication network environment in accordance with one embodiment. For clarity, the depicted process is described with reference to forwarding of a congestion notification message (CNM) toward a source end node (e.g., end node E1) causing congestion in a converged communication network carrying FCoE traffic.

The illustrated process begins at block 400 and then proceeds to block 402, which depicts FCF 114 forwarding network traffic including FCoE frames by reference to routing table 220. For example, as depicted in FIG. 1, FCF 114 forwards traffic received from end nodes E1 and E2 on virtual link 120c via the port connected to physical Ethernet link 104d toward end node E3 via the port connected to physical Ethernet link 104e.

At block 404, FCF 114 receives a congestion notification message (CNM), for example, a CNM originated by FSB 112 in accordance with the IEEE 802.1Qau standard in response to FSB 112 detecting congestion on physical Ethernet link 104c. Assuming that congestion is caused by end node E1, FSB 112 will detect the congestion in response to a triggering FCoE frame containing the addresses shown below in Table V:

TABLE V

| SMAC   | DMAC | FC SID | FC DID |
|--------|------|--------|--------|
| FCFMAC | FE3  | 1      | 3      |

It should be appreciated that the destination MAC address (DMAC) and the source MAC address (SMAC) are specified in destination and source MAC address fields 302 and 304 of the CNM, and the FC source ID (FC SID) and FC destination ID (FC DID) are specified in the encapsulated FC frame 322.

In accordance with the IEEE 802.1Qau standard, the CNM, which FSB 112 directs to the source MAC address of the triggering FCoE frame (i.e., the apparent source of the traffic causing congestion) via physical Ethernet link 104e, will contain a portion of the triggering FCoE frame and will specify the addresses shown in Table VI.

TABLE VI

| SMAC   | DMAC   | FC SID | FC DID |
|--------|--------|--------|--------|
| FSBMAC | FCFMAC | 1      | 3      |

At block 406, FCF 114 determines whether or not the destination MAC of the CNM matches that of FCF 114 (i.e., FCFMAC). If not, the process proceeds to block 416, which is described below. If, however, the destination MAC of the CNM matches that of FCF 114, FCF 114 (e.g., FCoE_LEP 210) extracts the source FC ID from the triggering frame contained in the CNM (block 408) and determines if the source FC ID, which identifies the FC-aware node that is the true source of the triggering frame, is present in routing table 220 (block 410). In response to a determination at block 410 that the source FC ID is not present in routing table 220, FCF 114 drops the CNM (block 412), and the process ends at block 420.

Returning to block 410, in response to determining that the source FC ID of the triggering frame is present in forwarding table 220, FCF 114 determines the destination MAC address associated with the source FC ID by routing table 220 (block 412) and updates the destination MAC address of the CNM (block 414). Thus, in the present example, FCF 114 produces a CNM having the address shown in Table VII.

TABLE VII

| SMAC | DMAC | FC SID | FC DID |
|---|---|---|---|
| FCFMAC | FDFMAC | 1 | 3 |

Thereafter, FCF 114 forwards the modified CNM toward the source end node causing the congestion via the physical port associated with the destination MAC address of the CNM (block 416), which in the present example is the physical port connected to physical Ethernet link 104*d*. Thereafter, the process shown in FIG. 4 terminates at block 420.

Thereafter, in response to receiving the CNM, FDF 110 repeats the process depicted at blocks 406-416 of FIG. 4, extracting the FC SID of 1 from the returned triggering frame within the CNM, consulting its routing tables for the FC ID of 1 to obtain a destination MAC address of FE1, and forwarding the CNM via the physical port identified by the routing table as connected physical Ethernet link 104*a*. Thus, the twice modified CNM will specify the addresses indicated in Table VIII, below.

TABLE VIII

| SMAC | DMAC | FC SID | FC DID |
|---|---|---|---|
| FDFMAC | FE1 | 1 | 3 |

In response to receipt of the CNM, source end node E1, the source of the congestion, will act upon the CNM appropriately to reduce congestion, for example, by implementing a backoff for the traffic.

As has been described, in some embodiments, a network node that forwards traffic of a converged network received from a source end node receives a second message addressed to the network node, but intended for the source end node. The second message includes at least a portion of a first message originated by the source end node and previously forwarded by the network node. The network node extracts from the first message a source identifier of the source end node in a first communication protocol and determines by reference to a data structure (e.g., a table) a destination address of the second message in a second communication protocol. The network node modifies the second message to include the destination address and forwards the second message toward the source end node in accordance with the destination address. In one implementation, the first communication protocol is Fibre Channel, the second communication protocol is Ethernet, the first message is a Fibre Channel over Ethernet (FCoE) frame, and the second message is a congestion notification message (CNM).

While the present invention has been particularly shown as described with reference to one or more preferred embodiments, it will be understood by those skilled in the art that various changes in form and detail may be made therein without departing from the spirit and scope of the invention. For example, although aspects have been described with respect one or more machines executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions. Further, although the present invention has been described with reference to the communication of congestion notification messages back to a source endpoint in a FCoE environment, it should be appreciated that the illustrated processes are more generally applicable to the communication of other messages to source endpoints in the presence of converged network traffic.

What is claimed is:

1. A program product, comprising:
   a tangible machine-readable storage device; and
   program code stored within the tangible machine-readable storage device that, when processed by a network node that forwards traffic of a converged network received from a source end node, causes the network node to perform:
      receiving a second message addressed to the network node by an original destination address of a second communication protocol, but intended for the source end node, wherein the second message includes:
         a message header including a source address and the original destination address of the second communication protocol;
         a message body having encapsulated therein at least a message header of a first message of a different first communication protocol, wherein the first message was originated by the source end node and previously forwarded by the network node, and wherein the message header of the first message includes a source identifier of the source end node and a destination identifier;
      extracting, from the message header of the first message encapsulated in the second message, the source identifier of the source end node;
      determining, by reference to the extracted source identifier and a data structure, an updated destination address of the second message in the second communication protocol; and
      modifying the second message to include the updated destination address instead of the original destination address and forwarding the second message toward the source end node in accordance with the updated destination address.

2. The program product of claim 1, wherein:
   the first communication protocol is Fibre Channel;
   the second communication protocol is Ethernet.

3. The program product of claim 2, wherein the network node is one of a set including a Fibre Channel over Ethernet (FCoE) forwarder (FCF) and a FCoE Data Forwarder (FDF).

4. The program product of claim 2, wherein:
   the first message is a Fibre Channel over Ethernet (FCoE) frame; and
   the second message is a congestion notification message (CNM).

5. The program product of claim 2, wherein the receiving comprises receiving the second message from a Fibre Channel over Ethernet (FCoE) Initiation Protocol (FIP) snooping bridge.

6. The program product of claim 1, wherein the program code further causes the network node to perform:
   dropping the second message in response to failing to find the source identifier of the source end node in the data structure.

7. A network node that forwards traffic of a converged network received from a source end node, the network node comprising:
   processing hardware; and data storage coupled to the processing hardware, the data storage including program code that, when processed by the network node, causes the network node to perform:

receiving a second message addressed to the network node by an original destination address of a second communication protocol, but intended for the source end node, wherein the second message includes:
- a message header including a source address and the original destination address of the second communication protocol;
- a message body having encapsulated therein at least a message header of a first message of a different first communication protocol, wherein the first message was originated by the source end node and previously forwarded by the network node, and wherein the message header of the first message includes a source identifier of the source end node and a destination identifier;

extracting, from the message header of the first message encapsulated in the second message, the source identifier of the source end node;

determining, by reference to the extracted source identifier and a data structure, an updated destination address of the second message in the second communication protocol; and modifying the second message to include the updated destination address instead of the original destination address and forwarding the second message toward the source end node in accordance with the updated destination address.

8. The network node of claim 7, wherein:
the first communication protocol is Fibre Channel;
the second communication protocol is Ethernet.

9. The network node of claim 8, wherein the network node is one of a set including a Fibre Channel over Ethernet (FCoE) forwarder (FCF) and a FCoE Data Forwarder (FDF).

10. The network node of claim 8, wherein:
the first message is a Fibre Channel over Ethernet (FCoE) frame; and
the second message is a congestion notification message (CNM).

11. The network node of claim 8, wherein the receiving comprises receiving the second message from a Fibre Channel over Ethernet (FCoE) Initiation Protocol (FIP) snooping bridge.

12. The network node of claim 7, wherein the program code further causes the network node to perform:
dropping the second message in response to failing to find the source identifier of the source end node in the data structure.

13. A method of data processing in a converged network, the method comprising:
at a network node that forwards traffic of the converged network received from a source end node, receiving a second message addressed to the network node by an original destination address of a second communication protocol, but intended for the source end node, wherein the second message includes:
- a message header including a source address and the original destination address of the second communication protocol;
- a message body having encapsulated therein at least a message header of a first message of a different first communication protocol, wherein the first message was originated by the source end node and previously forwarded by the network node, and wherein the message header of the first message includes a source identifier of the source end node and a destination identifier;

the network node extracting, from the message header of the first message encapsulated in the second message, the source identifier of the source end node;

the network node determining, by reference to the extracted source identifier and a data structure, an updated destination address of the second message in the second communication protocol; and the network node modifying the second message to include the updated destination address instead of the original destination address and forwarding the second message toward the source end node in accordance with the updated destination address.

14. The method of claim 13, wherein:
the first communication protocol is Fibre Channel;
the second communication protocol is Ethernet.

15. The method of claim 14, wherein the network node is one of a set including a Fibre Channel over Ethernet (FCoE) forwarder (FCF) and a FCoE Data Forwarder (FDF).

16. The method of claim 14, wherein:
the first message is a Fibre Channel over Ethernet (FCoE) frame; and
the second message is a congestion notification message (CNM).

17. The method of claim 14, wherein the receiving comprises receiving the second message from a Fibre Channel over Ethernet (FCoE) Initiation Protocol (FIP) snooping bridge.

18. The method of claim 13, and further comprising:
the network node dropping the second message in response to failing to find the source identifier of the source end node in the data structure.

* * * * *